United States Patent Office.

HERMANN SCHULZE-BERGE, OF PITTSBURG, PENNSYLVANIA, ASSIGNOR OF ONE-HALF TO JESSE H. LIPPINCOTT, OF SAME PLACE.

METHOD OF ETCHING GLASSWARE.

SPECIFICATION forming part of Letters Patent No. 276,895, dated May 1, 1883.

Application filed November 8, 1882. (No specimens.)

*To all whom it may concern:*

Be it known that I, HERMANN SCHULZE-BERGE, of Pittsburg, in the county of Allegheny and State of Pennsylvania, have invented a new and useful Improvement in Methods of Etching Glassware; and I do hereby declare the following to be a full, clear, and exact description thereof.

Previous to my invention the modes of etching glassware consisted, so far as I am aware, of two—one a chemical process, effected by the decomposing action of hydrofluoric acid on the silica of the glass, and the other a mechanical operation by means of a stream of sand projected against the surface to be etched.

In my process I rely on the action of hydrofluoric acid to etch the glass; and my invention is designed not only to obviate the inconvenience of covering the entire surface of the glass article with wax and then removing the wax from the parts to be acted on by the acid, but also to enable the writing or design to be written, traced, or painted directly upon the glassware without the necessity of using any composition for stopping off.

My improved method depends for its action upon a singular physical fact which I have discovered. It is well known that when a drop of hydrofluoric acid is applied to the surface of a piece of glass it spreads in all directions, so that it is impossible to write or draw any letters, figures, or designs on glass with hydrofluoric acid, as the lines would spread out and assume a broad and irregular outline. Hence the necessity of stopping off with wax those portions of the glass not to be acted on by the acid in the old method. Now, the fact which I have referred to, and on which my present invention is based, is that the behavior of hydrofluoric acid on glass changes as soon as the glass is heated to a temperature anywhere between 100° and 300° Fahrenheit. Between these degrees of heat the spreading action of the acid ceases, and the hydrofluoric acid can be applied to the surface of glass with the greatest facility, even the finest lines or touches remaining clear and distinct and with a sharp and well-defined outline. The temperature of the glass at which the best result is attained is between 160° and 200° Fahrenheit. If the glass is heated above 300° Fahrenheit, or thereabout, the hydrofluoric acid, when applied to the surface of the glass, commences to bubble, which prevents writing or sketching on the glass with any distinctness. The exact temperature at which the best result is attained cannot be stated, as it varies somewhat with the degree of concentration of the hydrofluoric acid.

In order to preserve the required temperature of the glass while it is being written or sketched upon with the acid, various appliances might be used, as the required degree of heat (under that of boiling water) can be easily attained and kept up without inconvenience to the artist or workman. For example, a current of heated air may be caused to pass under the glass or through it if it be hollow, or a heating-box or sand bath may be used, or a vessel of hot water. The pen, pencil, or brush used for painting with hydrofluoric acid can be made of any substance not attacked by the acid and which will not discolor or otherwise injuriously affect the surface of the glass.

By my method fine drawings, designs, and pictures can be eaten or produced in glass for the purpose of using the glass as a block or type for reprinting the same. This cannot be done by the old etching process, as it is impossible thereby to obtain the fine and delicate lines necessary for such purpose. This application of my improvement, however, forms the subject of a separate application for Letters Patent. The action of the acid is of course precisely the same as when the old stopping-off process is employed. I therefore do not claim the etching of glass by means of that acid; but What I do claim as my invention, and desire to secure by Letters Patent, is—

The method of producing impressions in etching or decorating glassware by writing, sketching, or painting on its surface with hydrofluoric acid when the glass is heated to a temperature between 100° and 300° Fahrenheit, substantially as hereinbefore described.

In testimony whereof I have hereunto set my hand this 26th day of October, A. D. 1882.

HERMANN SCHULZE-BERGE.

Witnesses:
T. B. KERR,
W. B. CORWIN.